United States Patent [19]

Rufer

[11] Patent Number: 4,904,920
[45] Date of Patent: Feb. 27, 1990

[54] METHOD AND DEVICE FOR OPERATING AN INDUCTION MACHINE

[75] Inventor: Alfred Rufer, Lauffohr, Switzerland

[73] Assignee: BBC Brown Boveri AG, Baden, Switzerland

[21] Appl. No.: 210,807

[22] Filed: Jun. 24, 1988

[30] Foreign Application Priority Data

Jul. 7, 1987 [CH] Switzerland .................. 2581/87

[51] Int. Cl.$^4$ .............................................. H02P 5/40
[52] U.S. Cl. ..................................... 318/800; 318/805
[58] Field of Search ................................ 318/800-811

[56] References Cited

U.S. PATENT DOCUMENTS

| | | | |
|---|---|---|---|
| 4,028,600 | 6/1977 | Blaschke et al. ..................... | 318/810 |
| 4,678,248 | 7/1987 | Depenbrock ........................ | 318/805 |
| 4,720,777 | 1/1988 | Yoki ................................... | 318/811 |
| 4,722,042 | 1/1988 | Asano et al. ........................ | 318/802 |
| 4,763,060 | 8/1988 | Takahashi ........................... | 318/811 |
| 4,800,478 | 1/1989 | Takahashi ........................... | 318/800 |

OTHER PUBLICATIONS

"A New Quick Response and High Efficiency Control Strategy of an Induction Motor", IEEE 1985 article by Isao Takahasahi and Toghihiko Noguchi.

Primary Examiner—David Smith, Jr.
Attorney, Agent, or Firm—Burns, Doane, Swecker & Mathis

[57] ABSTRACT

To reduce harmonics in an induction machine (33) which is fed by a self-commutated inverter (30), the trajectory of the flux vector of the induction machine is conducted along an edge path having at least $2^p \cdot q \cdot m$ edges, where p is an integral number $\geq 1$, $q \geq 2$ is the number of voltage stages of the inverter and $m \geq 2$ is the number of phases of the induction machine. In this arrangement, the flux vector is alternatingly conducted along straight and zig-zag segments. This reduction is essentially achieved by means of at least one second flux conducting circuit having a second coordinate converter (56) and a second comparator (57) in addition to a first flux conducting circuit having a first coordinate converter (54) and first comparator (46), the flux components ($\psi_{\beta 1'} - \psi_{\beta 3'}$) at the output of the second coordinate converter being shifted by 30° in phase with respect to the flux components ($\psi_{\beta 1} - \psi_{\beta 3}$) of the first coordinate converter. The comparator output signals (K11–K13, K11'–K13) are combined in a logic circuit (Y) in accordance with $Z2 = \overline{K11 \neq K11'} \wedge \overline{K12 \neq K12'} \wedge \ldots \overline{K1m \neq K1m'}$.

7 Claims, 9 Drawing Sheets

METHOD AND DEVICE FOR OPERATING AN INDUCTION MACHINE

BACKGROUND OF THE INVENTION

1. Field of the Invention

The invention is based on a method and a device for operating an induction machine.

2. Discussion of Background

The present invention relates to a prior art which is known from DE-A1 3,438,504. In this document, the magnetic flux vector is controlled along a hexagonal path in rotating-field drives with a wide dynamic range and having static converter feed and direct self-control. For this purpose, current and voltage signals are derived from the current feed lines to the induction machine and from these orthogonal flux components are obtained. These are converted into three phase flux components in a coordinate converter, their amplitude is converted to a nominal flux value in a subsequent flux controller or comparator and they are used for controlling the inverter in dependence on a flux-dependent and a torque-dependent change-over device. In this arrangement, unwanted harmonics occur.

SUMMARY OF THE INVENTION

The invention achieves the object of specifying a method and a device for operating an induction machine by means of which at least one current harmonic can be reduced.

An advantage of the invention consists in the fact that a dodecagonal path, in which the typical fifth and seventh harmonics of the hexagonal flux trajectory virtually no longer occur, can be generated even with a second coordinate converter and a second comparator circuit. The well regulated torque of the induction machine remains unaltered in this arrangement. The device according to the invention allows a transition from hexagonal to, for example, dodecagonal operation.

BRIEF DESCRIPTION OF THE DRAWINGS

In the text which follows, the invention is explained with reference to illustrative embodiments, in which:

FIGS. 8a–8l, FIGS. 9a–9r show signal timing diagrams for the device according to FIG. 1.

DESCRIPTION OF THE PREFERRED EMBODIMENTS

Figure 1:
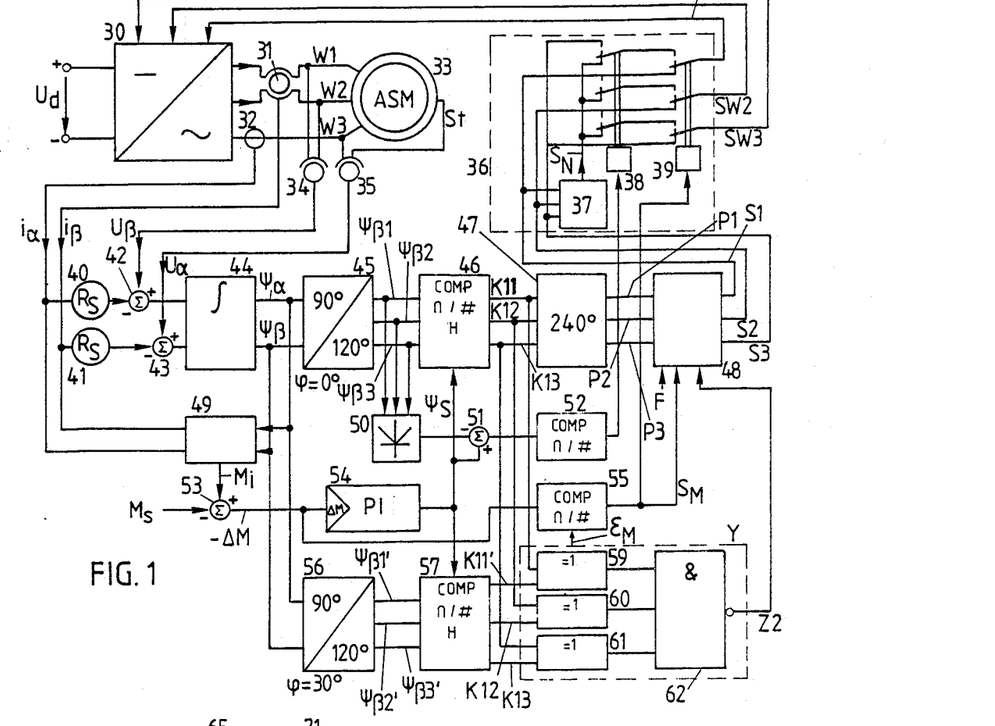
FIG. 1 shows a basic circuit diagram of a device for direct self-control of torque and flux of an induction machine having a selection circuit.
Figures 11, 12:
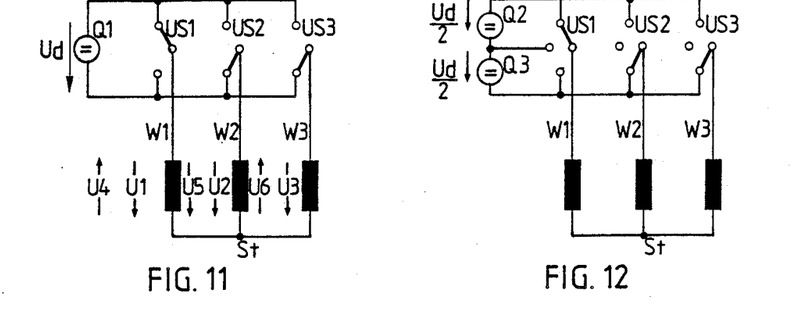
FIG. 11 shows a bridge circuit for 3 phases and 2 stages.
FIG. 12 shows a bridge circuit for 3 phases and 3 stages.

FIG. 1 shows a basic circuit diagram of a device for the direct self-control of torque M and flux $\psi$ of an induction machine or asynchronous machine 33 with stator winding W1, W2, W3 which exhibit a common neutral St, compare also FIG. 12. The asynchronous machine 13 is fed by a self-commutated inverter 30 which is supplied at its input with an input direct voltage Ud. In the feed line of the stator winding W3, a current transformer 32 is arranged which supplies at its output an orthogonal stator current component $i_\alpha$ to a multiplier 40 and a torque computer 49. The feed lines of the stator windings W1 and W2 are connected to a differential current transformer 31 which supplies at its output a stator current component $i_\beta$ which is orthogonal to $i_\alpha$, to a multiplier 41 and the torque computer 49. The multipliers 40 and 41, respectively, in each case multiply the values $i_\alpha$ and $i_\beta$ by the stator winding resistance Rs. The outputs of the multipliers 40 and 41 are connected to the inverting input of a summing circuit 42 and 43, respectively. The input of a voltage transformer 34 is connected to the stator windings W1 and W2 and its output is connected to a non-inverting input of the summing circuit 42 to which it supplies a stator voltage component $U_\beta$. The input of a voltage transformer 35 is connected to the stator winding W3 and the neutral St and its output is connected to a non-inverting input of the summing circuit 43 to which it supplies a stator voltage component $U_\alpha$ which is orthogonal with respect to $U_\beta$. The outputs of the summing circuits 42 and 43 are connected to inputs of an integrator 44, the output of which supplies orthogonal magnetic flux components $\psi_\alpha$ and $\psi_\beta$ to a first 90°/120° coordinate converter 45 with 0° phase shift, to the torque computer 49 and to a second 90°/120° coordinate converter 56 with 30° phase shift with respect to the coordinate converter 45.

Figures 2, 3:
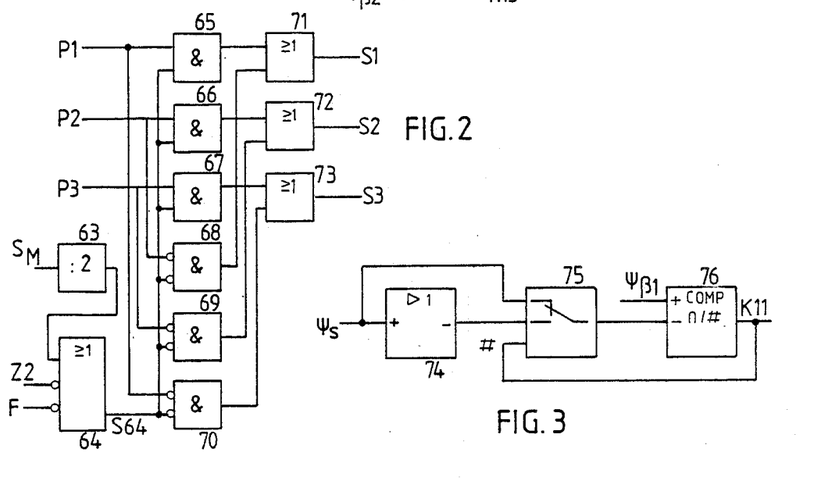
FIG. 2 shows a circuit diagram of the selection circuit of the device according to FIG. 1.
FIG. 3 shows a part of a comparator circuit with storage effect of the device according to FIG. 1 for a flux component.

The outputs of coordinate converters 45 and 56, respectively, supply $\beta$ flux components $\psi_\beta 1$, $\psi_\beta 2$, $\psi_\beta 3$ and $\psi_\beta 1'$, $\psi_\beta 2'$, $\psi_\beta 3'$, which are phase shifted by 120° relative to one another, to comparators 46 and 57, respectively, with storage effect, the configuration of which is explained in greater detail in conjunction with FIG. 3. The comparators 46 and 57 compare the $\beta$ flux components with a nominal flux value $\psi_s$, which is supplied by a proportional-integral controller or PI controller 54. Comparator output signals K11, K12, K13 of the comparator 46 are supplied, on the one hand, via a digital phase shifter 47, phase shifted by 240°, to a selection circuit 48, shown in greater detail in FIG. 2, as phase shifter output signals P1, P2, P3 and, on the other hand, to first inputs of exlusive OR gates 59 and 60 and 61, respectively. Comparator output signals K11′, K12′, K13′ of the comparator 57 are supplied to second inputs of the exclusive OR gates 59 and 60 and 61, respectively. The outputs of the exclusive OR gates 59, 60, 61 are connected to inputs of an AND gate with negated output or to a NAND gate 62 the output signal or zig-zag signal Z2 of which is supplied to the selection circuit 48. The exclusive OR gates 59, 60, 61 and the NAND gate 62 are combined to form a logic circuit Y, shown dashed.

The output of the torque computer 49 supplies an actual torque value $$M_i = 1.5 \cdot (\Psi_\alpha \cdot i_B - \Psi_B \cdot i_\alpha),$$

which is fed to a non-negated input of a summing circuit 53. A nominal torque value Ms is supplied to an inverting input of the summing circuit 53 from a higher-level device, not shown. The output of the summing circuit 53, at which the negative torque difference $-\Delta M$ is present, is connected, on the one hand, to the input of the PI controller 54 and, on the other hand, to an input of a comparator 55. The comparator 55 compares the negative torque difference $-\Delta M$ with a predeterminable torque tolerance value $\epsilon_M$ and supplies as an output signal a torque switching variable $S_M$, on the one hand to the selection circuit 48 and, on the other hand to a change-over device 39.

The flux components $\psi_{\beta 1}$, $\psi_{\beta 2}$ and $\psi_{\beta 3}$ are supplied to inputs of an amount-forming circuit 50, the output signal $\psi_{\beta 1}$ of which is supplied to an inverting input of a summing circuit 51. A non-inverting input of the summing circuit 51 is connected to the output of the PI controller 54. The output of the summing circuit 51, at which the flux difference $\Delta \psi$ can be picked up, is connected to an input of a comparator 52. The comparator 52 compares the flux difference $\Delta \psi$ with a predeterminable torque tolerance value $\epsilon \psi$ and supplies as an output signal a flux switching variable $S_\psi$ to a change-over device 38.

The output signals or switching state variables S1, S2, S3 of the selection device 48 are supplied to a zero state selection device 37 and to first change-over contacts of the change-over devices 38 and 39. The output of the zero state selection device 37 is connected to second change-over contacts of the change-over device 38. The change-over device 38 is connected, on the one hand, to second change-over contacts of the change-over device 39, at the output of which inverter control signals SW1, SW2 and SW3 are present which are supplied to control inputs of the inverter 30. The zero state selection device 37 and the change-over devices 38 and 39 are combined to form a signal converter 36, shown dashed.

The switching state variable $S_N$ emitted at the output of the zero state selection device 37 exhibits the logical values, as specified in Table 1, in dependence on the switching state variables S1, S2, S3.

TABLE 1

| S1 | S2 | S3 | $S_N$ | Voltage vector |
|---|---|---|---|---|
| 1 | 0 | 0 | 0 | U1 |
| 1 | 1 | 0 | 1 | U2 |
| 0 | 1 | 0 | 0 | U3 |
| 0 | 1 | 1 | 1 | U4 |
| 0 | 0 | 1 | 0 | U5 |
| 1 | 0 | 1 | 1 | U6 |
| 1 | 1 | 1 | 1 | U0 |
| 0 | 0 | 0 | 0 | U0 |

Figures 4, 5:
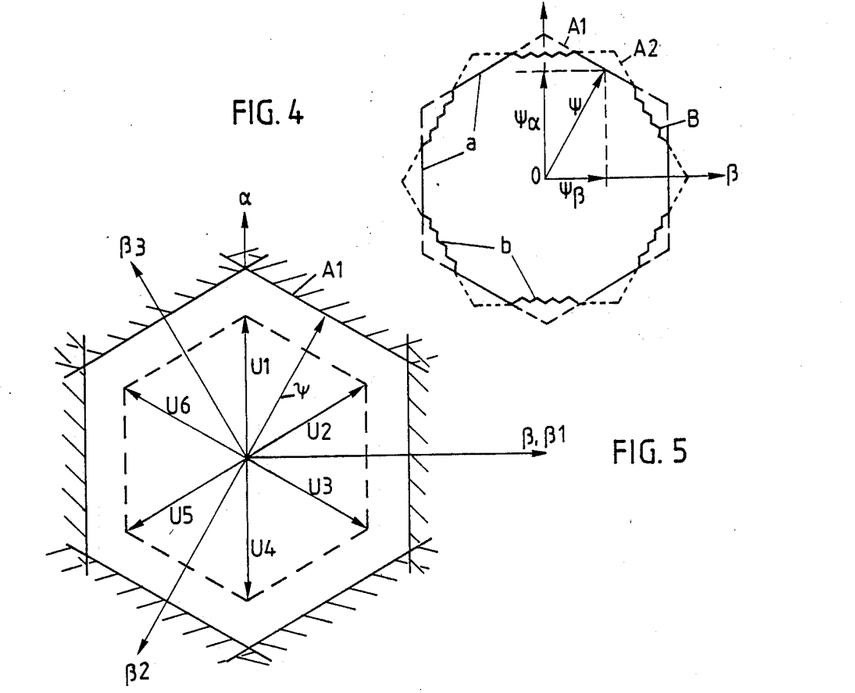
FIG. 4 shows hexagonal and dodecagonal flux trajectories with orthogonal flux coordinates.
FIGS. 5 and 6 show vector diagrams of voltage and flux vectors with hexagonal flux tolerance polygons.
Figure 6:
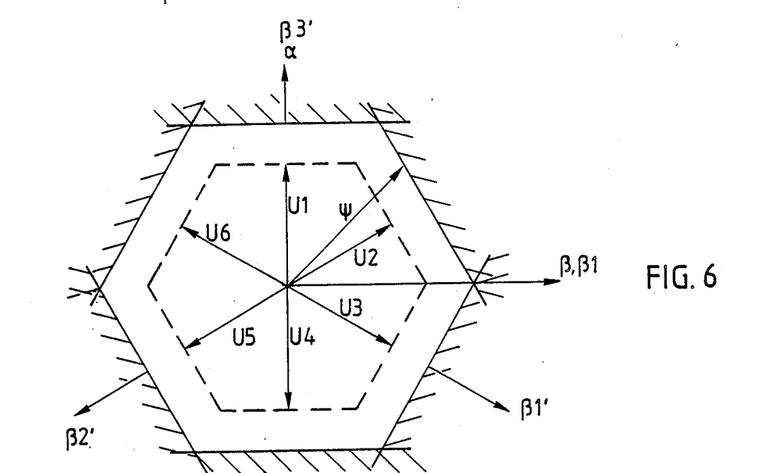

The switching state variables S1, S2, S3 define seven voltage vectors U0–U6, compare FIGS. 5 and 6 with U1=−U4, U2=−U5, U3=−U6 and U0=0.

FIG. 2 shows a circuit diagram of the selection circuit 48 of FIG. 1. Inverting inputs of an OR gate 64 are supplied with the zig-zag signal Z2 and with an enable signal F from a higher-level device, not shown. The torque switching variable $S_M$ is supplied via a binary counter or a divider 63 with divisor of 2 to a non-negated input of OR gate 64. The output of the OR gate 64 is connected to first inputs of AND gates 65, 66, 67 and AND gates with inverted inputs 68, 69, 70. The phase shifter output signals P1 and P2 and P3 are supplied to second inputs of the AND gates 65 and 70, and 66 and 68, and 67 and 69. The inputs of OR gates 71 and 72 and 73 are connected to the outputs of the AND and NOR gates 65 and 68 and 66 and 69 and 67 and 70; the switching variables S1 and S1 and S3, respectively, can be picked up at their outputs.

FIG. 3 shows the circuit of a part of the comparator 46 with storage effect for the flux component $\psi_{\beta 1}$. The circuits for the flux components $\psi_{\beta 2}$ and $\psi_{\beta 3}$ correspond to those for $\psi_{\beta 1}$. The nominal flux value $\psi_s$ is supplied, on the one hand, directly to a first input and, on the other hand, via an inverting amplifier 74 to a second input of a change-over or alternating switch 75, the output of which is connected to an inverting input of a comparator 76. The flux component $\psi_{\beta 1}$ ($\psi_{\beta 2}$, $\psi_{\beta 3}$) is supplied to a non-inverting input of this comparator 76. The comparator output signal K11 (K12, K13) of the comparator 76 is supplied to a control signal input of the change-over switch 75 so that the latter is switched over in dependence on a limit value being exceeded in the comparator 76 from $\psi_s$ to $-\psi_s$ and conversely.

In the text which follows, the action of the circuit shown in FIG. 1 is shown with reference to FIGS. 4–10.

Figure 10:
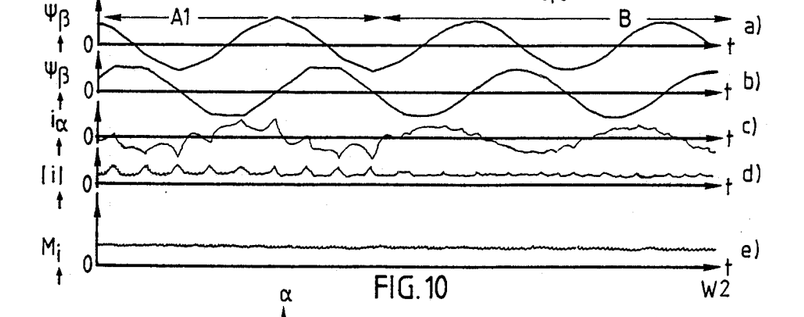
FIG. 10 shows signal timing diagrams of flux and current components, harmonics content and actual torque value for hexagonal and dodecagonal operation.

In FIG. 4, $\psi$ denotes a flux vector with orthogonal flux components $\psi_\alpha$, $\psi_\beta$, which rotates clockwise along a dodecagonal flux trajectory B which exhibits six straight segments a and six zig-zag segments b. $\alpha$ and $\beta$ denote orthogonal stator axes. The dodecagonal flux trajectory B is produced by superimposing a hexagonal flux trajectory A1, shown dashed, with a point on the $\alpha$ axis and a hexagonal flux trajectory A2, shown dotted, with a point in the direction of the $\beta$ axis which is rotated by 30° with respect to A1. The zig-zag segments b eliminate the corners of the original hexagonal flux trajectory A1 and thus their effect on the current shape, compare the stator current component $i_\alpha$ in FIG. 10c. In this figure, the left-hand part of the illustration refers to hexagonal operation in accordance with flux trajectory A1 and the right-hand part refers to dodecagonal operation according to flux trajectory B. Hexagonal operation is possible without and dodecagonal operation with a second coordinate convertor 56, a second comparator 57 and a logic circuit Y, the circuit according to FIG. 1 allowing a transition from hexagonal to dodecagonal mode during operation. This additional feature makes it possible to achieve a sector division which is increased by a factor of 2 (12 zones instead of 6) by means of which the flux trajectory can be improved and thus the typical harmonics of the hexagonal flux trajectory (5th and 7th harmonic) can be significantly reduced.

The self-control system uses internal phase-related machine variables which must be selected from $\alpha$ and $\beta$ flux components in the flux simulation. The phase-related $\beta$ flux components $\psi_{\beta1}$, $\psi_{\beta2}$, $\psi_{\beta3}$, compare FIG. 4, are particularly suitable for this purpose. $\beta1-\beta3$ designate 120° axes of projection and U1–U6 designate 6 discrete voltage vectors which are available in addition to the voltage vector U0=O with a constant input direct voltage Ud via the three-phase inverter 30 for controlling the asynchronous machine 33. With timing at fundamental frequency, the voltage vector successively assumes the discrete values determined by U1, U2 ... in a cyclic sequence. The stay time in each position is 1/6 of the voltage period in steady-state operation. The variation of the three stator winding voltages with time is obtained as a projection of the voltage vector, which abruptly moves clockwise, to the three stator winding or projection axes $\beta1$, $\beta2$, $\beta3$. Correspondingly, stator voltage components U$_\alpha$ and U$_\beta$, compare FIGS. 8k, 8l, 9b and 9c of the three-phase voltage system are obtained as a projection of stator axes $\alpha$ and $\beta$ which are perpendicular to one another and are also at rest.

Ignoring the voltage $|i| \cdot R_s$ ($|i|$=stator current) which is dropped across the copper resistances of the stator windings and which is small compared with the stator voltage in the field weakening area, the respective voltage vector determines the respective position of the flux vector $\psi$ with respect to speed and direction.

Conducting the machine flux vector along a hexagonal path with the aid of three tolerance bands, indicated shaded, which are oriented in accordance with the phase-related $\beta$ flux components, is directly possible by switching on the available seven convertor voltages U0–U6.

FIGS. 8a–8d show the variation of the $\psi_\alpha$ and $\psi_\beta$ flux components together with the phase-related $\psi_{\beta1}$, $\psi_{\beta2}$ and $\psi_{\beta3}$ flux components. These quantities are formed in accordance with the following equations (1):

$$\psi_{\beta1} = \psi_\beta, \quad (1)$$

$$\psi_{\beta2} = -\psi_\beta/2 - \psi_\alpha \cdot \sqrt{3}/2,$$

$$\psi_{\beta3} = -\psi_\beta/2 + \psi_\alpha \cdot \sqrt{3}/2.$$

Figure 8A:
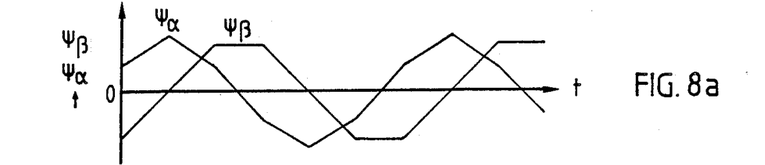
Figure 8B:
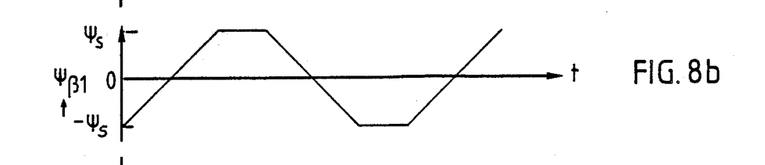
Figure 8C:
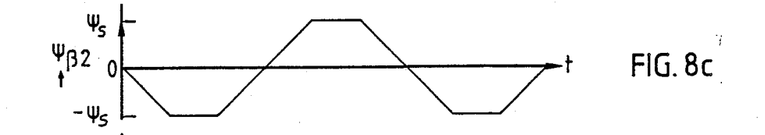
Figure 8D:
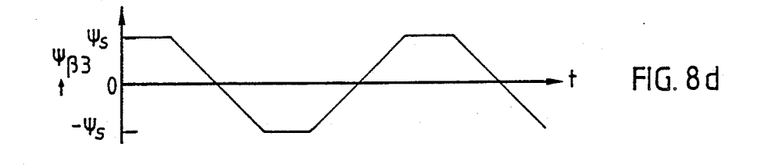
Figures 8E, 8F, 8G:
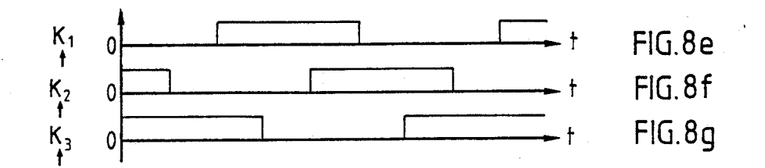
Figure 8H:
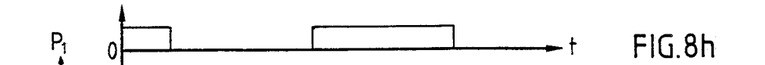
Figure 8I:
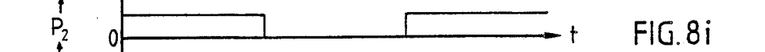
Figure 8J:
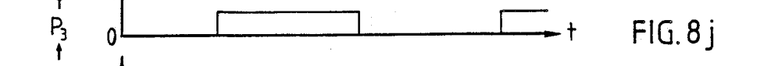
Figures 8K, 8L:
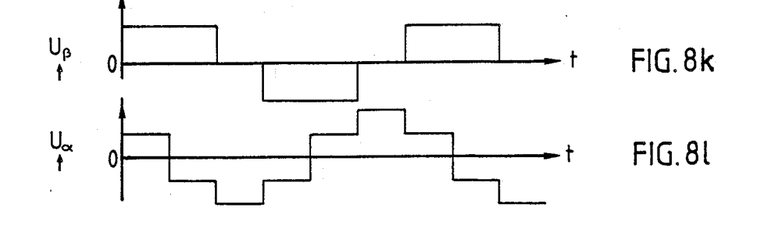

In the composite comparator 46 consisting of three comparators in accordance with FIG. 3, information is obtained on phase-related flux tolerance bands. If the upper positive limit of the tolerance band $\psi_s$ in a phase is reached, the comparator of the corresponding phase switches from "0" to "1". Conversely, the comparator switches back from "1" to "0" when the lower negative limit of the band $-\psi_s$ is reached. The comparator output signals K1, K2 and K3 associated with the flux quantities in FIGS. 8a–8d are shown in FIGS. 8e–8g. In FIGS. 8h–8j, the corresponding phase shifter output signals P1, P2 and P3 are specified which determine the voltage of the inverter 30. In the case of timing at fundamental frequency, this voltage variation shown in FIGS. 8k and 8l causes the trapezoidal $\psi_\beta$ flux variation which corresponds to the circulation on a hexagonal path in the vector representation.

The drive law for direct self-control can also be obtained from the timing diagram of FIG. 8. The following relation exists between the outputs of the phase shifter output signals P1, P2, P3 correctly associated with the phases:

P1=K12,

P2=K13,             (2)

P3=K11.

These equations (2) correspond to phase shifts of 240° between voltages and fluxes. The control command or the switching state variable S1 is in phase with the first phase voltage (W1) of the asynchronous machine 33. The $\alpha$ axis is defined parallel to this voltage so that U$_\beta$ trails the control command by 90°. The flux component $\psi_\beta$ is delayed by a further 90° compared with U$_\beta$ (voltage integral). Thus, S1 and the $\psi_{\beta1}$ flux component exhibit a phase shift of 180°. Due to the trapezoidal shape of the flux, the switching threshold $\psi_s$ of the comparator 45 is reached 60° after the positively directed zero transition. An addition of these part shifts supplies: 90°+90°+60°=240° corresponding to Equation (2).

The second coordinate convertor 56 is used for generating three phase-related flux components $\psi_{\beta1}'$, $\psi_{\beta2}'$, $\psi_{\beta3}'$ which are phase shifted by a shift angle of $\psi=30°$ compared with the three flux components $\psi_{\beta1}$, $\psi_{\beta2}$, $\psi_{\beta3}$ of the first coordinate convertor 45. They are obtained in accordance with the following equations:

$$\psi_{\beta1}' = \psi_\beta \cdot \sqrt{3}/2 - \psi_\beta/2, \quad (3)$$

$$\psi_{\beta2}' = \psi_\beta \cdot \sqrt{3}/2 - \psi_\beta/2,$$

$$\psi_{\beta3}' = \psi_\beta.$$

This second 30° flux component system, like the first channel, is supplied to the comparator 57 which is of the same construction as comparator 46. The tolerance bands, shown shaded, which are thus formed for the $\beta$ flux components $\psi_{\beta1}'$, $\psi_{\beta2}'$, $\psi_{\beta3}'$ can be seen in the vector diagram of FIG. 6. $\beta1'$, $\beta2'$ and $\beta3'$ designate 120° axes of projection. The new tolerance bands form a hexagonal figure in which, in this case, two "points" of the hexagon are oriented in accordance with the $\beta$ axis and not in accordance with the $\alpha$ axis as in the first hexagonal figure according to FIG. 5.

Figure 9:
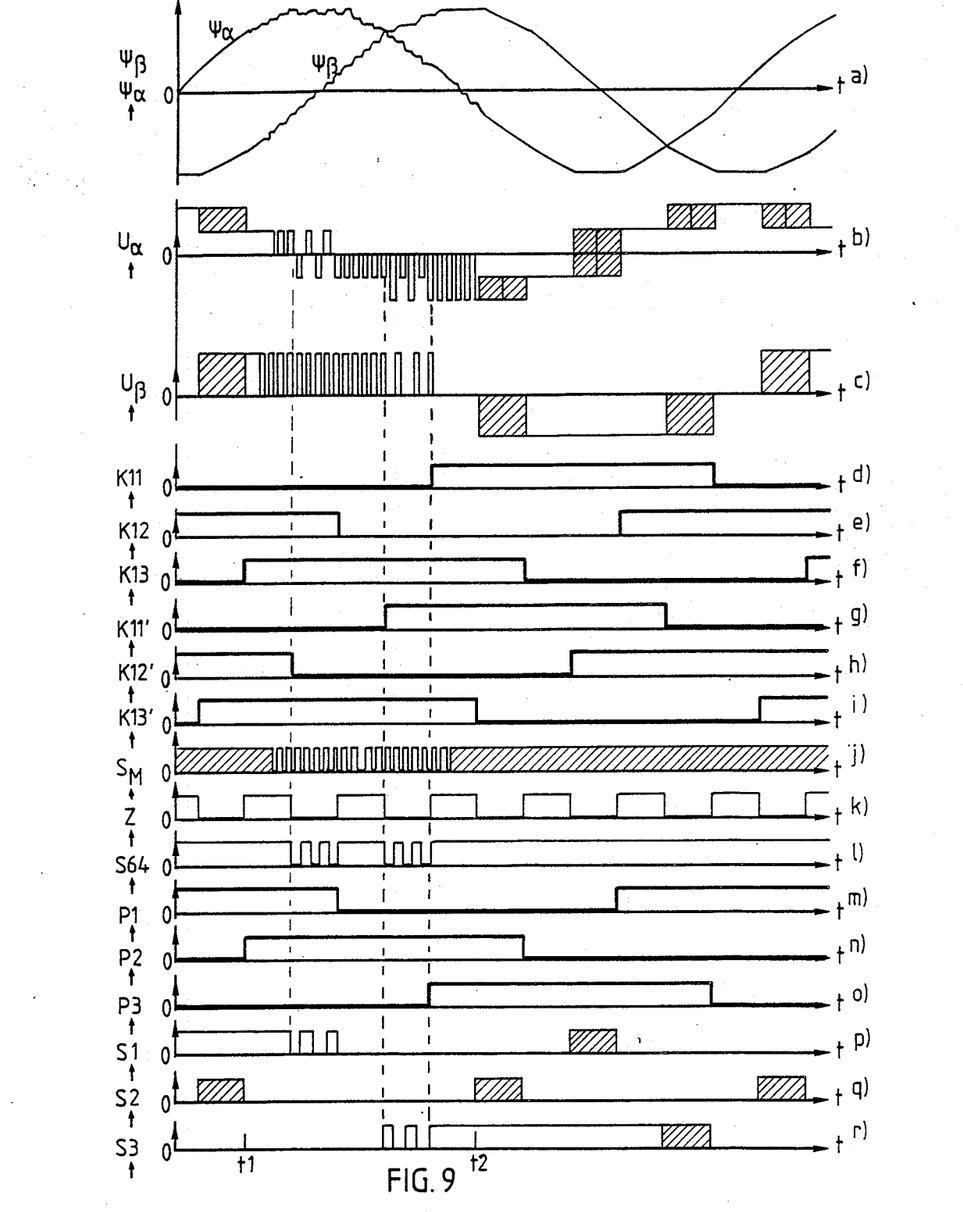

The previously mentioned dodecagonal figure is obtained by superimposing the two hexagonal flux tolerance polygons, compare FIG. 6. Six comparator output signals K11–K13, K11'–K13' are available, the variation of which with time is shown in FIGS. 9e–9i with respect to associated orthogonal flux components $\psi_\alpha$, $\psi_\beta$ in FIG. 9a and orthogonal stator voltage components U$_\alpha$, U$_\beta$ in FIGS. 9b and 9c. In FIG. 9, the signals are shown in detail between arbitrarily selected times t1 and t2 and for the rest only the envelope curves are shown shaded.

FIG. 9k shows the zig-zag signal Z2 which is obtained in accordance with the following equation (4):

$$Z2 = \overline{K11 \neq K11'} \wedge \overline{K12 \neq K12'} \wedge \overline{K13 \neq K13'}. \quad (4)$$

With Z2="1", the comparator output signals K11, K12, K13 of the first channel correspond to the comparator output signals K11', K12', K13' of the second channel. With Z2="1", the flux vector $\psi$ is in a transition zone between two adjacent 60° sectors of the hexagonal figure. The correction of hexagonal flux trajectory A1 can be initiated with the aid of the zig-zag signal Z2. At Z2="0", it is assumed that no flux amount correction is to be initiated so that a straight segment a of the hexagonal flux trajectory A1 is run as flux trajectory. A pulse play occurs due to torque-dependent switching actions, the same voltage vector, for example UI in FIG. 7, always being switched on as voltage vector apart from U0 and with switching state 000 (coding 10 10 10) or 111 (coding 01 01 01), compare Table 1, switching states no. 8 and 7. This voltage vector is predetermined by the first channel of the self-control system with P1, P2, P3, compare FIGS. 9m-9o. The switching state variables S1-S3 derived from this are shown in FIGS. 9p-9r.

Figure 7:
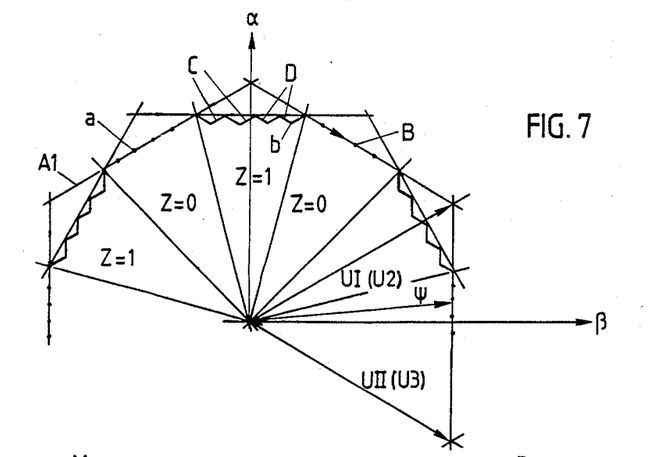
FIG. 7 shows a section of a vector diagram of a dodecagonal flux polygon.

With Z2="1", a zig-zag segment b can be run as flux trajectory if no flux amount corrections are initiated. Due to the torque-dependent switching actions, a complicated pulse play now occurs, two different voltages UI and UII being alternatingly switched on as voltage vector, apart from U0 (state 000 or 111), compare FIG. 7. UI is predetermined by P1, P2, P3 from the first channel of the self-control system, with the coding:

$$S1 = P1,$$
$$S2 = P2, \quad (5)$$
$$S3 = P3.$$

A voltage vector leading by 60° is selected as second voltage UII. The coding of this vector is obtained from P1, P2, P3, the following equation (6) holding true:

$$S1 = \overline{P2},$$
$$S2 = \overline{P3}, \quad (6)$$
$$S3 = \overline{P1}.$$

The alternating selection of voltage vectors UI and UII is implemented by means of the selection circuit 48, compare FIGS. 1 and 2. For this purpose, the torque-dependent switching variable $S_M$, compare FIGS. 2 and 9j, is conducted as digital signal to the binary counter or divider 63. This generates a change-over signal S64, compare FIG. 9l, by means of which the leading voltage, for example UII, is switched on with each second switching action by the torque switching variable $S_M$. The result of these change-over switching operations is a zig-zag segment b for the flux trajectory which is composed of alternating trajectory sections C in the direction of the first voltage UI and trajectory sections D in the direction of the second voltage UII, compare FIG. 7.

FIG. 10e shows that the well regulated torque (actual torque value $M_1$) remains unchanged during transition from hexagonal operation (flux trajectory A1) to dodecagonal operation (flux trajectory B). $|i|$, compare FIG. 10d, represents a measure of the harmonics content which is distinctly reduced for dodecagonal operation compared with hexagonal operation. The corresponding orthogonal flux components $\psi_a$ and $\psi_\beta$ are shown in FIGS. 10a and 10b.

Figure 13:
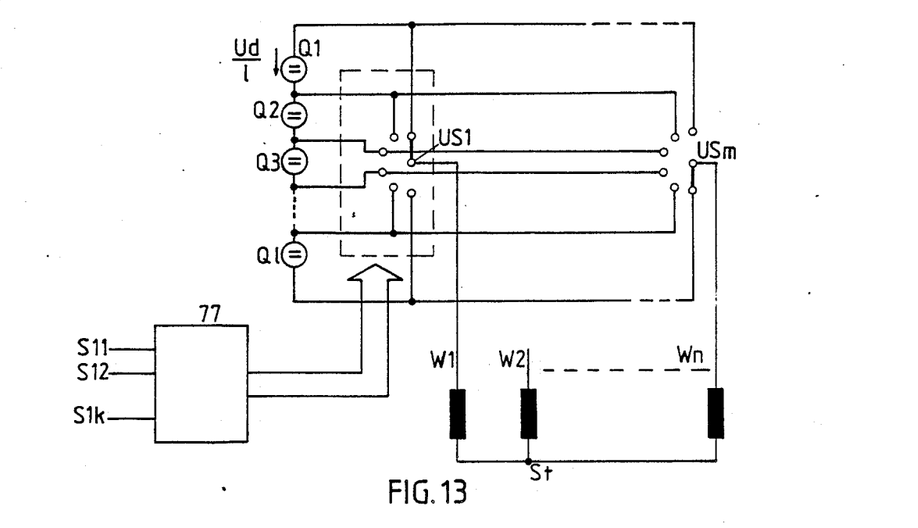
FIG. 13 shows a bridge circuit for m phases and l+1 stages.

The method for compensating harmonics described is not restricted to conventional two-stage inverters with 3-phase alternating voltage, compare FIG. 11, but can be generally used for q-stage inverters with m phases, compare FIG. 13. In FIGS. 11-13, Q1-Ql designate direct-current sources which, together with change-over switches US1 ... USm represent inverters which are controlled by a valve control logic 77 in dependence on switching state variables S11 ... S1k. W1 ... Wm designate stator windings of an induction machine.

An inverter having m phases and $q=l+1$ stages per phase, compare FIG. 13, enables, at its alternating-voltage side $q^m$ voltage vectors to be generated which are defined by $q^m$ switching states. Of the $q^m$ voltage vectors, q are identical and equal to zero. For one phase, the q different stages are selected via a binary word having a bit length k and are driven by means of the valve control logic 77. The following holds true for the word length k:

$$2^k \geq g. \quad (7)$$

Not all of the $q^m$-q voltage vectors available for feeding a multi-phase load are needed for the method described. A number of r peripheral vectors is selected which are distributed, at the same phase interval, if possible, over the electric period of 360°, their absolute value being as close as possible to the maximum amount of the voltage of one inverter having m phases, in which only two stages are selected. In the trivial example of the three-phase/two-stage bridge circuit according to FIG. 11, the r peripheral vectors to be selected are the 6 vectors U1-U6 which are not 0, compare also FIG. 16. $r = 2^3 - 2 = 8 - 2 = 6$, compare also Table 1.

As a second example, a three-phase/three-stage inverter represented in FIG. 12 should be mentioned. Of the total of $3^3 = 27$ switching states, $27 - 3$ switching states determine a voltage vector which is not zero. 12 of the 24 possible voltages are selected. These r peripheral vectors exhibit an equal phase interval of 30°. These peripheral vectors are designated by U1, U9, U2, U10, U3, U11, U4, U12, U5, U13, U6 and U14 in FIG. 17. For selecting the three stages, two bits are need for one phase, compare the coding in Table 2.

TABLE 2

| | | | SWITCHING STATE | | | | | | |
|---|---|---|---|---|---|---|---|---|---|
| | | | VOLTAGES chained phase | | | | VOLTAGE VECTOR | | |
| | | | | | | | right-angle $\alpha-\beta$ components | | abs. value and angle |
| No. | symbol | coding | $\dfrac{U_{w1w2}}{Ud}$ | $\dfrac{U_{w2w3}}{Ud}$ | $\dfrac{U_{w1}}{Ud}$ | $\dfrac{U_{w2}}{Ud}$ | $\dfrac{U_\alpha}{Ud}$ | $\dfrac{U_\beta}{Ud}$ | $\dfrac{|U|}{Ud}$ arc(U) |
| 2-stage inverter | | | | | | | | | |
| 1 | ↘↗↗ | 01 10 10 | 1 | 0 | 2/3 | −1/3 | 2/3 | 0 | 2/3   0° |
| 2 | ↘↘↗ | 01 01 10 | 0 | 1 | 1/3 | 1/3 | 1/3 | $1/3 \sqrt{3}$ | 2/3   60° |

TABLE 2-continued

| | | | SWITCHING STATE | | | | | | | |
|---|---|---|---|---|---|---|---|---|---|---|
| | | | VOLTAGES chained phase | | | | VOLTAGE VECTOR | | | |
| | | | | | | | right-angle $\alpha$-$\beta$ components | | abs. value and angle | |
| No. | symbol | coding | $\dfrac{U_{w1w2}}{Ud}$ | $\dfrac{U_{w2w3}}{Ud}$ | $\dfrac{U_{w1}}{Ud}$ | $\dfrac{U_{w2}}{Ud}$ | $\dfrac{U_\alpha}{Ud}$ | $\dfrac{U_\beta}{Ud}$ | $\dfrac{|U|}{Ud}$ | arc(U) |
| 3 | ╱╲╱ | 10 01 10 | −1 | 1 | −1/3 | 2/3 | −1/3 | 1/3 $\sqrt{3}$ | 2/3 | 120° |
| 4 | ╱╲╲ | 10 01 01 | −1 | 0 | −2/3 | 1/3 | 2/3 | 0 | 2/3 | 180° |
| 5 | ╱╲╲ | 10 10 01 | 0 | −1 | −1/3 | −1/3 | −1/3 | −1/3 $\sqrt{3}$ | 2/3 | 240° |
| 6 | ╲╱╲ | 01 10 01 | 1 | −1 | 1/3 | −2/3 | 1/3 | −1/3 $\sqrt{3}$ | 2/3 | 300° |
| 7 | ╲╲╲ | 01 01 01 | 0 | 0 | 0 | 0 | 0 | 0 | 0 | — |
| 8 | ╱╱╱ | 10 10 10 | 0 | 0 | 0 | 0 | 0 | 0 | 0 | — |
| additionally with 3-stage inverter | | | | | | | | | | |
| 9 | ╲─╱ | 01 00 10 | 1/2 | 1/2 | 1/2 | 0 | 1/2 | 1/6 $\sqrt{3}$ | 1/3 $\sqrt{3}$ | 30° |
| 10 | ─╲╱ | 00 01 10 | −1/2 | 1 | 0 | 1/2 | 0 | 1/3 $\sqrt{3}$ | 1/3 $\sqrt{3}$ | 90° |
| 11 | ╱╲─ | 10 01 00 | −1 | 1/2 | −1/2 | 1/2 | −1/2 | 1/6 $\sqrt{3}$ | 1/3 $\sqrt{3}$ | 150° |
| 12 | ╱─╲ | 10 00 01 | −1/2 | −1/2 | −1/2 | 0 | −1/2 | 1/6 $\sqrt{3}$ | 1/3 $\sqrt{3}$ | 210° |
| 13 | ─╱╲ | 00 10 01 | 1/2 | 1 | 0 | −1/2 | 0 | −1/3 $\sqrt{3}$ | 1/3 $\sqrt{3}$ | 270° |
| 14 | ╲╱─ | 01 10 00 | 1 | −1/2 | 1/2 | −1/2 | 1/2 | 1/6 $\sqrt{3}$ | 1/3 $\sqrt{3}$ | 330° |
| 15 | ╲─── | 01 00 00 | 1/2 | 0 | 1/3 | −1/6 | 1/3 | 0 | 1/3 | 0° |
| 16 | ╲╲─ | 01 01 00 | 0 | 1/2 | 1/6 | 1/6 | 1/6 | 1/6 $\sqrt{3}$ | 1/3 | 60° |
| 17 | ─╲─ | 00 01 00 | −1/2 | 1/2 | −1/6 | 1/3 | −1/6 | 1/6 $\sqrt{3}$ | 1/3 | 120° |
| 18 | ─╲╲ | 00 01 01 | −1/2 | 0 | −1/3 | 1/6 | −1/3 | 0 | 1/3 | 180° |
| 19 | ─── | 00 00 01 | 0 | −1/2 | −1/6 | −1/6 | −1/6 | 1/6 $\sqrt{3}$ | 1/3 | 240° |
| 20 | ╲─╲ | 01 00 01 | 1/2 | −1/2 | 1/6 | −1/3 | 1/6 | 1/6 $\sqrt{3}$ | 1/3 | 300° |
| 21 | ─╱╱ | 00 10 10 | 1/2 | 0 | 1/3 | −1/6 | 1/3 | 0 | 1/3 | 0° |
| 22 | ──╱ | 00 00 10 | 0 | 1/2 | 1/6 | 1/6 | 1/6 | 1/6 $\sqrt{3}$ | 1/3 | 60° |
| 23 | ╱─╱ | 10 00 10 | −1/2 | 1/2 | −1/6 | 1/3 | −1/6 | 1/6 $\sqrt{3}$ | 1/3 | 120° |
| 24 | ╲── | 10 00 00 | −1/2 | 0 | −1/3 | 0 | −1/6 | 0 | 1/3 | 180° |
| 25 | ╱╱─ | 10 10 00 | 0 | −1/2 | −1/6 | −1/6 | −1/6 | 1/6 $\sqrt{3}$ | 1/3 | 240° |
| 26 | ─╱─ | 00 10 00 | 1/2 | −1/2 | 1/6 | −1/3 | 1/6 | 1/6 $\sqrt{3}$ | 1/3 | 300° |
| 27 | ─── | 00 00 00 | 0 | 0 | 0 | 0 | 0 | 0 | 0 | — |

Figure 14:
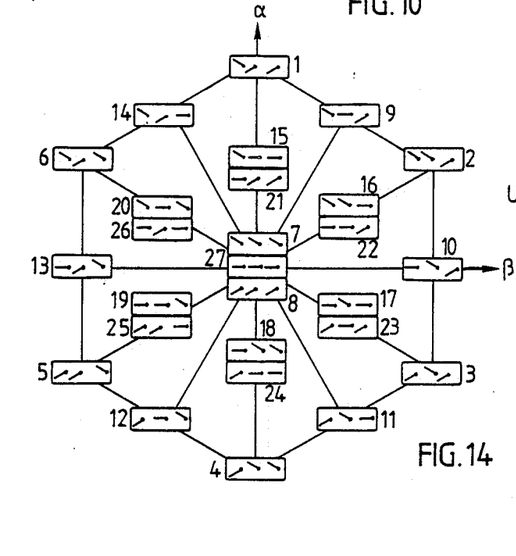
FIG. 14 shows voltage vectors of switching states in the two- and three-stage pulse inverter.
Figure 15:
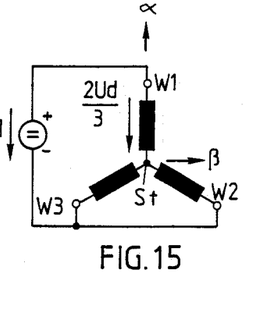
FIG. 15 shows voltage ratios in the switching state 1 according to FIG. 14.

The data from Table 2 and FIGS. 14 and 15 are known, with adapted designations, from the thesis by Manfred W. Gekeler, Dreiphasige spannungseinprägende Dreistufenwechselrichter (Three-phase voltage-impressing three-stage inverters), Department 17, Electrical Energy Technology, Darmstadt Technical College, 28 June, 1984 (date of submission), pages 18–21.

Table 2 shows switching state codings, voltages and voltage vectors for 27 switching states. Switching state no. 9 corresponds to $U_{w15t} = Ud/2$, $U_{w25t} = 0$, $U_{w35t} = -Ud/2$.

FIG. 14 shows voltage vectors, marked by the switching state numbers according to Table 1, in the two-stage inverter (1–8) and, according to Table 2, in the three-stage inverter (1–27). FIG. 15 shows the voltage conditions in the case of switching state 1, in which the voltage vector not shown would point in the direction of the $\alpha$ axis.

Figure 18:
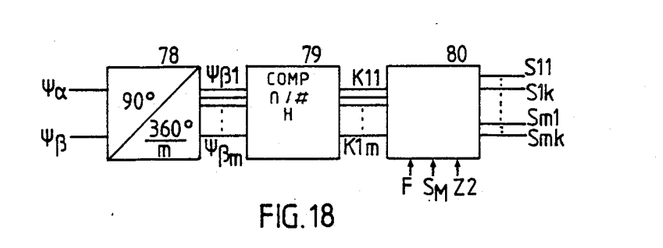
FIG. 18 shows a flux conducting and selection circuit for a device according to FIG. 1, but for m phases.

An r-sided polygon exhibiting r straight segments is defined for the flux trajectory of an induction machine with r vectors which are successively selected or switched on by means of pulse play, alternating with the zero state. In a selected voltage vector the flux vector runs along a straight segment which is parallel to this voltage vector. When the voltage zero vector is selected, the flux vector remains stationary. In the case of the three-phase/two-stage inverter circuit, the r-sided polygon is a hexagonal path as is known from the method with direct self-control from the DE-A1 3,438,504 initially mentioned. In this case, the commutation circuit consists of a component convertor 78 and a comparator 79, compare FIG. 18. The selection of a peripheral vector or of the zero state is implemented by means of a digital command or the torque switching variable $S_M$, compare FIG. 1. $S_M$ is determined by a two-position torque controller or the comparator 55. The output of the component convertor 78 supplies flux components $\psi_{\beta 1} \ldots \psi_{\beta m}$ at an equal phase interval of 360°/m to the comparator 79, the output signals K11 ... K1m of which are supplied to the selection circuit 80. At the output of he selection circuit 80, k switching variables: S11 ... S1k, S21 ... S2k, ... Sm1 ... Smk can be picked up for each phase.

An r-sided polygon can also be run as a flux trajectory in a case of a drive which is not directly self-controlled. The successive selection of the r peripheral vectors is in this case determined by a ring counter 88, compare FIG. 19. The mean value for the output voltage is determined via a traditional pulse-width modulation by means of a sawtooth generator 91, a summing circuit 92 and a comparator 93, the utput signal S93 of which is supplied to a selection circuit 89. From the feed lines of the asynchronous machine 33, stator current components $iw_1$ and $1_{w3}$ are obtained by means of current transformers 84 and 32 and are fed to a speed controller 86. Such a speed controller is known from the German Company Journal BBC Information 65 (1983), pages 375-384, particularly FIG. 10. The speed controller 86 is supplied with a nominal speed value $n_s$ from a higher-level device, not shown and with an actual speed value $n_i$ from a speed transmitter 85 coupled to the rotor of the asynchronous machine 33. The output of the speed controller 86 supplies, on the one hand, a frequency-determining signal f via a direct-voltage frequency converter 87 to the ring counter 88 and, on the other hand, a voltage-determining signal U to a non-inverting input of the summing circuit 92. The output of the sawtooth generator 91 is connected to an inverting input of the summing circuit 92. The input of the comparator 93 receives the output signal of the summing circuit 92. The switching state variables S11 ... S1k, ... Sm1 ... Smk at the output of the selection circuit 89 are used for controlling the inverter 30.

Figure 19:
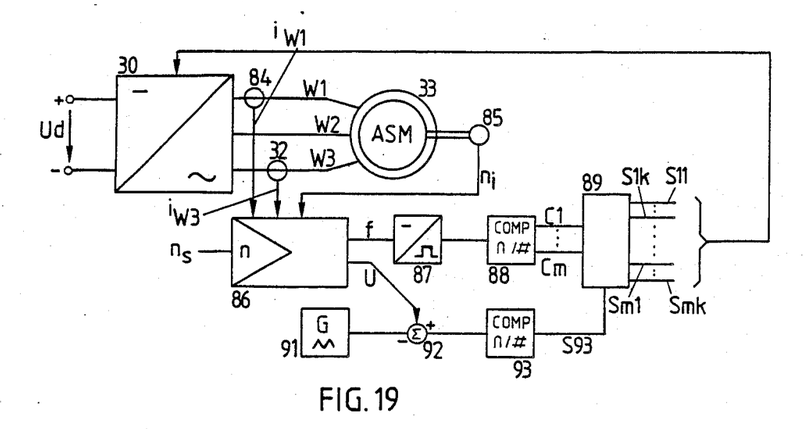
FIG. 19 shows a basic circuit diagram of a drive which is not directly self-controlled and in which the successive peripheral flux vectors are predetermined by means of a ring counter, having a selection and pulse logic circuit.
Figure 20:
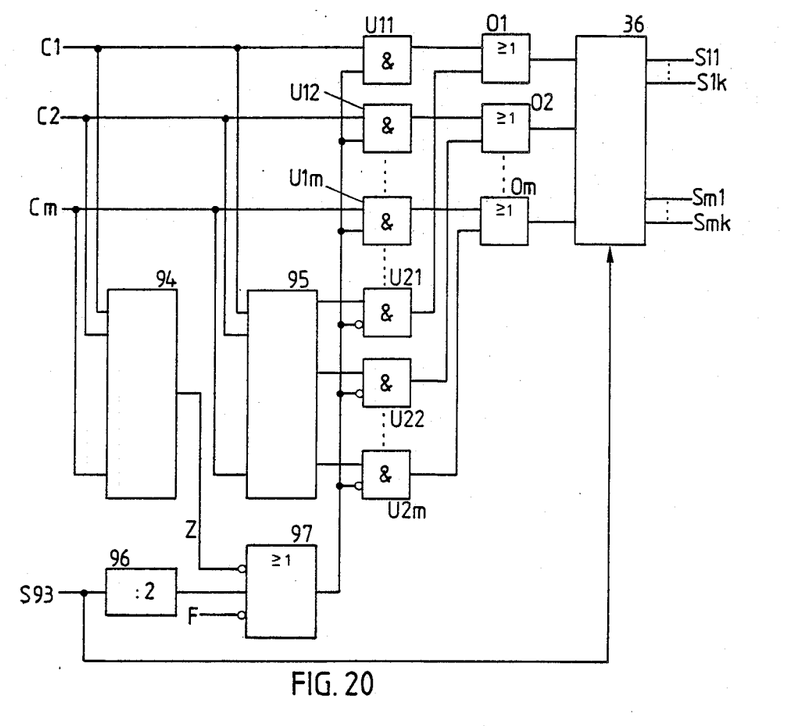
FIG. 20 shows a circuit diagram of the selection circuit according to FIG. 19.

FIG. 20 shows a circuit diagram of the selection circuit 89 of FIG. 19. 94 denotes a decoder, 95 a coder, 96 a binary divider for the output signal S93, 97 an OR gate having two inverting inputs for the enable signal F and the zig-zag signal Z from the output of the decoder 94. The output of the binary divider 96 is connected to a non-inverting input of the OR gate 97. The output signals C1 ... Cm are supplied to the decoder 94, the coder 95 and AND gates U11 ... U1m. m output signals of the coder 95 are supplied to AND gates U21 ... U2m. The output signal of the OR gate 97 is supplied to non-inverting inputs of the AND gates U11 ... U1m and to inverting inputs of the AND gates U21 ... U2m. The outputs of the AND gates U11 and U21 are connected to inputs of an OR gate 01, the outputs of the AND gates U12 and U22 are connected to inputs of an OR gate 02 and so forth. The outputs of the OR gates 01 ... Om are supplied to a signal converter 36 according to FIG. 1 which, however, is extended from three to m phases.

The coder 95 determines the "alternative" voltage vector which is rotated with respect to the normal one. Signal converter 36 makes it possible to select either the peripheral vector or the zero state via the signal S93.

Figure 21:
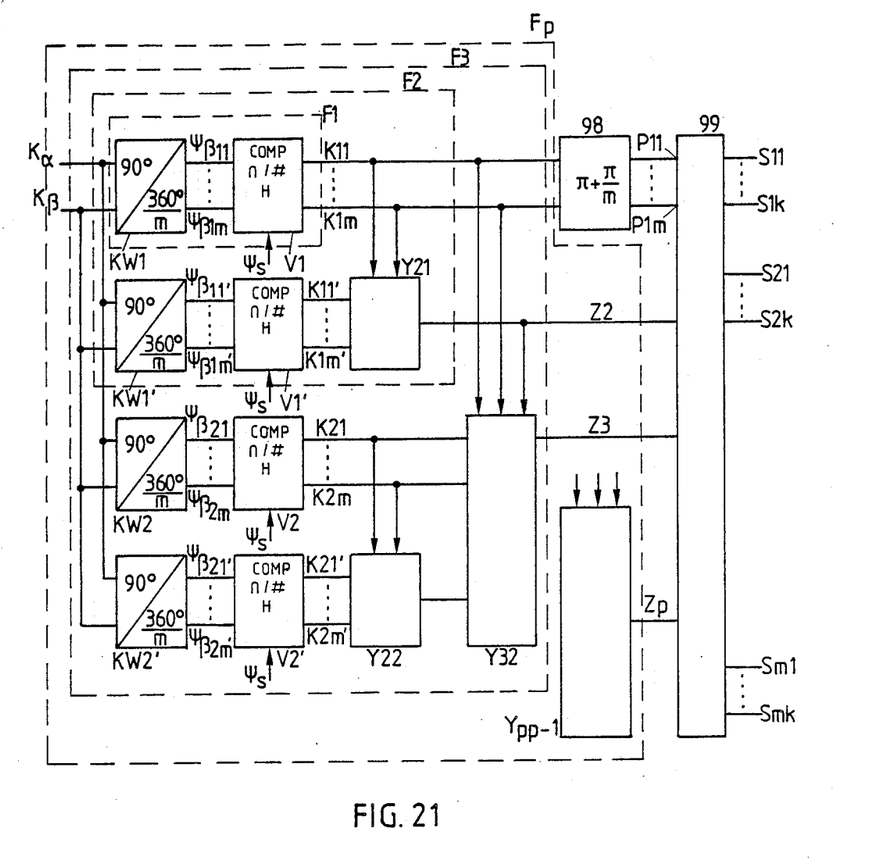
FIG. 21 shows a flux conducting and selection circuit, expanded to m phases and more than 2 stages of the inverter, for a device according to FIG. 1.

FIG. 21 shows flux conducting circuits F1 ... Fp, a digital phase shifter 98 and a selection circuit 99 for the directly self-controlling operation of an induction machine having m phases and more than two stages per phase. p denotes the number of flux conducting circuits which are formed by doubling, starting from the second circuit. The circuit shown in FIG. 21 represents an extension, which can be easily seen, to the corresponding circuit section (components 45-48, 56, 57, Y) of FIG. 1 so that a representation of the remaining components can be omitted. KW1, KW1'; KW2, KW2' ... denote m-phase coordinate converters, V1, V1'; V2, V2' ... in each case denote subsequent m-phase comparators, Y21, Y22 ... Ypp-1 logic circuits having the same configuration as the logic circuit Y, only extended from three to m phases. Z2 ... Zp denote zig-zag signals which are supplied from the output of the logic circuits Y21 ... Ypp-1 to the selection circuit 99 which is of the same configuration as the selection circuit 48 shown in FIG. 2, only extended from three to m phases. At the output of the selection circuit, switching state variables S11 ... S1k, ... Sm1 ... Smk can be picked up and are supplied to a signal converter 36 according to FIG. 1 which is correspondingly extended from three to m phases. $\psi_{\beta 1}, \ldots \psi_{\beta 1m}$ denote m components at the output of the first coordinate converter KW1 having a phase interval of 360°/m relative to one another, $\psi_{\beta 11}, \ldots \psi_{\beta 1m}$ denote m flux components at the output of the second coordinate converter KW1' which are phase shifted by $\psi = 180°/(2^p \cdot m)$ relative to the flux components at the output of KW1, and so forth. The following relations hold true for Zj:

$$Z2 = \overline{K11 \not\equiv K11'} \wedge \overline{K12 \not\equiv K12'} \wedge \ldots \overline{K1m \not\equiv K1m'},$$

$$Z_j = \sum_{i=1}^{j-1} \overline{Ki1 \not\equiv Ki1'} \wedge \overline{Ki2 \not\equiv Ki2'} \wedge \overline{Kim \not\equiv Kim'} \wedge$$

$$\overline{K11 \not\equiv K_{j-1}, 1} \wedge \overline{K12 \not\equiv K_{j-1}, 2} \wedge \ldots$$

$$\overline{K1m \not\equiv K_{j-1}, m} \wedge Z_{j-1}$$

for j = 3 ... p.

The phase shifter 98 produces a phase shift of 180° + 180°/m for each comparator output signal K11 ... K1m. $2^m$ sectors can be coded with the m switching commands or phase shifter output signals P11 ... P1m thus obtained.

The extended flux conducting circuit is implemented in accordance with the principle of doubling. F2 is the first extension stage for the basic flux conducting circuit F1. For the next extension, a second polygon is defined by means of a second basic flux conducting circuit (KW2, V2) and a second extension circuit (KW2', V2'). Compared with the first one, the second polygon is rotated in such a manner that a new third polygon having twice as many sides as in the case of the first or second polygon is produced when the two polygons are superimposed.

For example, the extension of a hexagonal path to a dodecagonal path is achieved with the aid of two phase-shifted hexagonal paths. This extension method can be arbitrarily applied to more than two stages. In practice, no higher pulse number than 12 or 24 is required.

Figure 16:
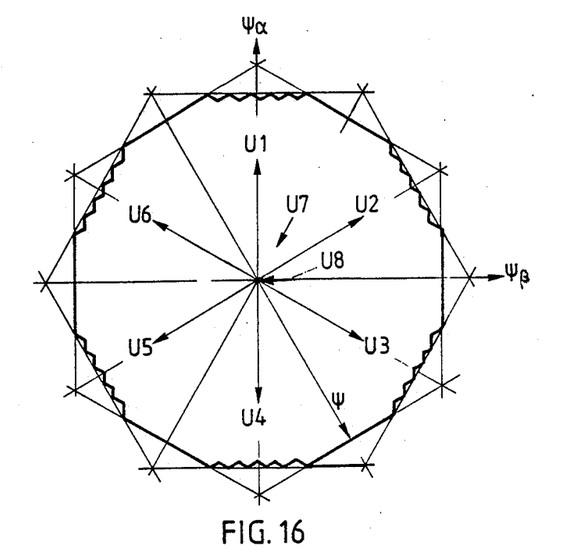
FIG. 16 shows a flux trajectory for 3 phases and 2 stages with zig-zag segments.
Figure 17:
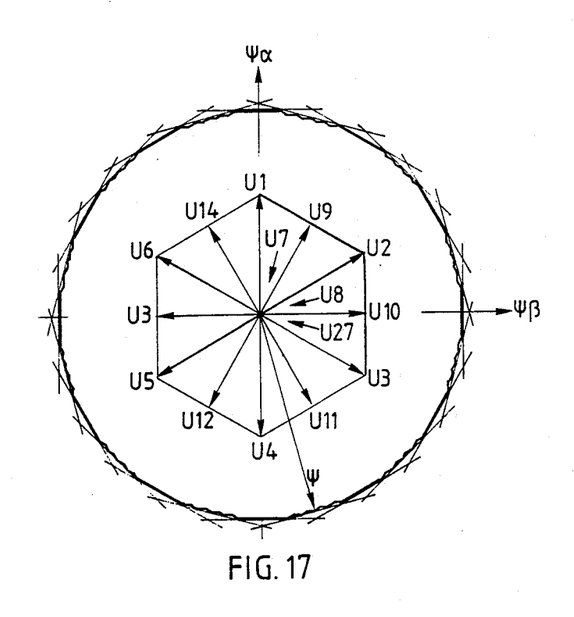
FIG. 17 shows a flux trajectory for 3 phases and 3 stages with zig-zag segments.

Instead of an r-sided polygon (for exampel r=6) an s-sided polygon is used for the flux trajectory in the case of the modified method (for example s=12), where s is equal to $2^p \cdot r$, $p \geq 1$, integral. The s-sided polygon consists of r straight segments alternating with s-r zig-zag segments which, if necessary, consist of several segment groups. As long as the flux vector is on a straight segment, only a peripheral vector is switched through in alternation with the zero vector. Zig-zag segments are defined in such a manner that the envelope curve of the flux trajectory is a straight segment which is tracked by means of pulse play by the zero vector and by two adjoining alternatingly selected peripheral vectors. Examples of modified flux trajectories with zig-zag segments are given in FIGS. 16 and 17 for three-phases and two stages and for three phases and three stages, respectively. FIG. 16 shows a 12-cornered path and FIG. 17 shows a 24-cornered path.

The orthogonal stator current components $i_\alpha$, $i_\beta$ and the orthogonal stator current components $U_\alpha$, $U_\beta$ can also be simulated, instead of in the manner specified in connection with FIG. 1, by means of the control signals S1–S3 and the detected input direct voltage Ud. This has the advantage that the neutral St does not need to be brought out. In the embodiment according to FIG. 19, $i_\alpha$ and $i_\beta$ can be simulated with $i_{w1}$ and $i_{w3}$ as measurement variables. $U_\alpha$ and $U_\beta$ can be simulated in accordance with the following equations:

$$U_\alpha = Ud/3 \ (2S1 - S2 - S3) \text{ and}$$

$$U_\beta = Ud/\sqrt{3} \ (S2 - S3)$$

What is claimed as new and desired to be secured by Letters Patent of the United States is:

1. Device for operating an induction machine (33) via a self-commutated inverter (30, Q1–Ql),
   (a) which exhibits a flux conducting circuit for controlling the inverter,
   (b) the flux conducting circuit exhibiting a first comparator (46, V1) for comparing m first actual flux value components ($\psi_1-\psi_3$; $\psi_{11}-\psi_{1m}$) of the induction machine (33) with at least one nominal flux value ($\psi_s$), m = the number of phases,
   (c) m first comparator output signals (K11–K13) produced by this comparison being supplied via a signal converter (36) to the inverter (30), wherein
   (d) the output of the first comparator (46, V1) is control-connected, on the one hand, via a phase shifter device (47, 98) to a selection circuit (48, 99) for a phase shift of $180° + 180°/m$ and
   (e) on the other hand, via at least one logic circuit (Y, Y21-Yp-1) to this selection circuit,
   (f) the output of the selection circuit is effectively connected to the signal converter (36),
   (g) at least one second coordinate converter (56, KW1, KW2, KW2') is provided which supplies m second actual flux value components ($\psi_{\beta1}'-\psi_{\beta3}'$; $\psi_{\beta11}'-\psi_{\beta1m}'$, $\psi_{\beta2m}-\psi_{\beta2m'}$), which are phase shifted by a predeterminable angle ($\psi$) with respect to these m first actual flux value components ($\psi_{\beta1}-\psi_{\beta3}$; $\psi_{\beta11}-\psi_{\beta1m}$), to at least one second comparator (57, V1', V2') which compares these second actual flux value components with the at least one nominal flux value ($\psi_s$),
   (h) m second comparator output signals (K11'–K1m', K21'–K2m') produced by this second comparator are supplied to the at least one logic circuit,
   (i) the logic circuit exhibits elements (63–73) for logically combining the first and second comparator output signals in accordance with the following relation:

$$Z2 = \overline{K11 \not\equiv K11'} \wedge \overline{K12 \not\equiv K12'} \wedge \ldots \overline{K1m \not\equiv K1m'}, \wedge$$

$$Z_j = \sum_{i=1}^{j-1} \overline{Ki1 \not\equiv Ki1'} \wedge \overline{Ki2 \not\equiv Ki2'} \wedge \overline{Kim \not\equiv Kim'}$$

$$\overline{K11 \not\equiv K_{j-1}, 1} \wedge \overline{K12 \not\equiv K_{j-1}, 2} \wedge \ldots$$

$$\overline{K1m \not\equiv K_{j-1}, m} \wedge Z_{j-1}$$

for j = 3 ... p.

2. Device as claimed in claim 1, wherein
   (a) at least one first coordinate converter (45, KW1) is provided, the output of which is effectively connected to the first comarator (46, V1) and
   (b) the inputs of the first and second coordinate converters (45, KW1; 65, KW1', KW2, KW2') are supplied with orthogonal flux components ($\psi_\alpha$, $\psi_\beta$), the first and second coordinate converters converting the orthogonal flux components into m phase flux components having an equal phase interval (360°/m).

3. Device as claimed in claim 2, wherein the second actual flux value components ($\psi_{\beta1}'-\psi_{\beta s}'$) are shifted in by $180°/(m \cdot 2^p)$ in phase with respect to the first actual flux component value ($\psi_{\beta1}-\psi_\beta$), m = number of phases, $p \geq 1$, integral.

4. Device as claimed in claim 2 wherein
   (a) the selection circuit (48, 99) exhibits for each phase (m) an AND gate (65–67) having non-inverting inputs and an AND gate (68–70) having inverting inputs, the inputs of which are effectively connected via first inputs to a phase output (P1, P3, P11–P1m), corresponding to the respective phase, of the phase shifter device (47, 98) and the outputs of which are effectively connected to an OR gate (71, 73) which is associated with the respective phase, and
   (b) an OR gate (64) is provided, the input of which is supplied with a torque switching variable ($S_M$) via a binary counter (63), also a zig-zag signal (Z2) and an enable signal (F) and the output of which is effectively connected to second inputs of the AND gates having non-negating inputs and of the AND gates having negating inputs.

5. Device as claimed in one of claim 1 wherein several first and second flux conducting circuits (KW1, V1, KW1'-V1'; KW2, V2, KW2', V2') are logically combined in groups, the individual groups being shifted in phase relative to one another.

6. A method for operating an induction machine that is fed via a self-controlled inverter having $q \geq 2$ voltage stages and $m \geq 2$ phases, comprising the steps of:
   generating for each phase of the induction machine at leat one first phase flux component and a second phase flux component phase shifted with respect to said first phase flux component by a predeterminable flux shift angle = $180°/(2^p \cdot m)$ where p is an integral number $\geq 1$;
   monitoring each first and second phase flux component in a comparator for exceeding of a predeterminable flux limit value;
   shifting in phase by $180° + 180°/m$ all comparator output signals obtained from the first flux components;
   forming at least one zig-zag signal in dependence on comparator output signals derived from the first and second phase flux components in accordance with the relations:

$$Z2 = \overline{K11 \not\equiv K11'} \wedge \overline{K12 \not\equiv K12'} \wedge \ldots \overline{K1m \not\equiv K1m'},$$

$$Z_j = \sum_{i=1}^{j-1} \overline{Ki1 \not\equiv Ki1'} \wedge \overline{Ki2 \not\equiv Ki2'} \wedge \overline{Kim \not\equiv Kim'} \wedge$$

$$\overline{K11 \not\equiv K_{j-1}, 1} \wedge \overline{K12 \not\equiv K_{j-1}, 2} \wedge \ldots$$

$$\overline{K1m \not\equiv K_{j-1}, m} \wedge Z_{j-1}$$

for j=3 . . . p; and using all said comparator output signals obtained from the first flux components, in dependence on said at least one zig-zag signal, for controlling the inverter, whereby the trajectory of the flux vector of the induction machine is conducted along an edge path having at least $2^p \cdot q \cdot m$ edges, the flux vector of the induction machine being alternatingly conducted on straight segments and zig-zag segments along the edge path, the envelope curve of each zig-zag segment forming an edge of the edge path.

7. Method as claimed in claim 1, wherein the flux vector ($\psi$) is generated in dependence on a predeterminable voltage (UI) in the area of a straight edge path segment (a) and alternatingly in dependence on two different predeterminable voltages (UI, UII) in the area of a zig-zag segment (b).

* * * * *